US009286029B2

(12) United States Patent  
Raux et al.

(10) Patent No.: US 9,286,029 B2  
(45) Date of Patent: Mar. 15, 2016

(54) SYSTEM AND METHOD FOR MULTIMODAL HUMAN-VEHICLE INTERACTION AND BELIEF TRACKING

(71) Applicants: Honda Motor Co., Ltd., Tokyo (JP); Ian Lane, Sunnyvale, CA (US)

(72) Inventors: Antoine Raux, Cupertino (CA); Ian Lane, Sunnyvale, CA (US); Rakesh Gupta, Mountain View, CA (US)

(73) Assignees: Honda Motor Co., Ltd., Tokyo (JP); Ian Lane, Sunnyvale, CA (US)

( * ) Notice: Subject to any disclaimer, the term of this patent is extended or adjusted under 35 U.S.C. 154(b) by 219 days.

(21) Appl. No.: 13/934,396

(22) Filed: Jul. 3, 2013

(65) Prior Publication Data

US 2014/0361973 A1 Dec. 11, 2014

Related U.S. Application Data

(60) Provisional application No. 61/831,783, filed on Jun. 6, 2013.

(51) Int. Cl.
*G09G 5/00* (2006.01)
*G06F 3/16* (2006.01)
*G06F 3/01* (2006.01)

(52) U.S. Cl.
CPC ........ *G06F 3/167* (2013.01); *G06F 3/01* (2013.01); *G06F 3/017* (2013.01)

(58) Field of Classification Search
USPC .......................................... 345/156; 715/863
See application file for complete search history.

(56) References Cited

U.S. PATENT DOCUMENTS

| 7,027,974 | B1* | 4/2006 | Busch et al. .................. 704/4 |
| 8,219,406 | B2 | 7/2012 | Yu et al. |
| 2010/0281435 | A1 | 11/2010 | Bangalore et al. |
| 2011/0022393 | A1 | 1/2011 | Waller et al. |
| 2012/0053945 | A1 | 3/2012 | Gupta et al. |
| 2012/0105257 | A1 | 5/2012 | Murillo et al. |
| 2013/0030811 | A1* | 1/2013 | Olleon et al. ............... 704/267 |
| 2013/0158778 | A1* | 6/2013 | Tengler et al. ............. 701/31.5 |
| 2014/0074454 | A1* | 3/2014 | Brown ............... G06F 19/345 704/9 |

OTHER PUBLICATIONS

Title: Probabilistic Ontology Trees for Belief Tracking in Dialog Systems. Neville Mehta, Rakesh Gupta, Antoine Raux. Proceedings of SIGDIAL 2010: the 11th Annual Meeting of the Special Interest Group on Discourse and Dialogue, pp. 37-46, The University of Tokyo, Sep. 24-25, 2010. 2010 Association for Computational Linguistics.*

(Continued)

*Primary Examiner* — Jason Olson
*Assistant Examiner* — Sosina Abebe
(74) *Attorney, Agent, or Firm* — Rankin, Hill & Clark LLP (57) ABSTRACT

A method and system for multimodal human-vehicle interaction including receiving input from an occupant in a vehicle via more than one mode and performing multimodal recognition of the input. The method also includes augmenting at least one recognition hypothesis based on at least one visual point of interest and determining a belief state of the occupant's intent based on the recognition hypothesis. The method further includes selecting an action to take based on the determined belief state.

12 Claims, 9 Drawing Sheets

(56) References Cited

OTHER PUBLICATIONS

He Wei; Li Honglian; Yuan Baozong, "Domain adaptation augmented by state-dependence," Neural Networks and Signal Processing, 2003. Proceedings of the 2003 International Conference on, vol. 2, no., pp. 883,886 vol. 2, Dec. 14-17, 2003.

Tam, Yik-Cheung, and Tanja Schultz. "Dynamic Language Model Adaptation Using Variational Bayes Inference." Ninth European Conference on Speech Communication and Technology. 2005.

Muller, C.; Weinberg, G., "Multimodal Input in the Car, Today and Tomorrow," MultiMedia, IEEE, vol. 18, No. 1, pp. 98,103, Jan. 2011.

Ian Lane, Vinay Prasad, Gaurav Sinha, Arlette Umuhoza, Shangyu Luo, Akshay Chandrashekaran, and Antoine Raux. 2012. HRItk: the human-robot interaction ToolKit rapid development of speech-centric interactive systems in ROS. In NAACL-HLT Workshop on Future Directions and Needs in the Spoken Dialog Community: Tools and Data (SDCTD Jun. 7, 2012). Association for Computational Linguistics, Stroudsburg, PA, USA, 41-44.

Fernando Fernandez-Martinez, J. Ferreiros, J. M. Lucas-Cuesta, J. M. Montero-Martinez, R. San-Segundo, and R. Cordoba. 2012. Towards building intelligent speech interfaces through the use of more flexible, robust and natural dialogue management solutions. Interact. Comput. 24, (Nov. 6, 2012), 482-498.

\* cited by examiner

SYSTEM AND METHOD FOR MULTIMODAL HUMAN-VEHICLE INTERACTION AND BELIEF TRACKING

This application claims priority to U.S. Provisional Application Ser. No. 61/831,783, which is expressly incorporated herein by reference.

BACKGROUND

The advent of sophisticated in-vehicle systems, including navigation and infotainment systems, has created a driving experience centered on human-vehicle interaction. Human-vehicle interaction is best facilitated with multimodal inputs including communicative and physical actions. The combination of communicative and physical actions with speech recognition, natural language understanding and computer imaging makes the design and deployment of such systems complex. To create truly immersive human-vehicle interaction, these systems must be context-aware of the human and vehicle environment.

SUMMARY

According to one aspect, a method for multimodal human-vehicle interaction includes receiving input from an occupant in a vehicle via more than one mode, performing multimodal recognition of the input and augmenting a recognition hypothesis based on a visual point of interest. The method further includes determining a belief state of the occupant's intent based on the recognition hypothesis and selecting an action to take based on the determined belief state.

According to another aspect, a method for multimodal human-vehicle interaction includes receiving an input from an occupant of a vehicle including a first input and a second input, wherein the first and second inputs represent different modalities, and performing multimodal recognition of the first and second inputs. The method further includes modifying a recognition hypothesis of the first input with the second input, determining a belief state of the occupant's intent and selecting an action to take based on the determined belief state.

According to a further aspect, a system for multimodal human-vehicle interaction includes a plurality of sensors for sensing interaction data from a vehicle occupant, the interaction data representing more than one mode, and a multimodal recognition module for performing multimodal recognition of the interaction data and augmenting a recognition hypothesis based on a visual point of interest. The system further includes a belief tracking module for determining a belief state of the occupant's intent based on the recognition and a dialog management and action module for selecting an action to take based on the determined belief state.

DETAILED DESCRIPTION

The embodiments describe herein include definitions of selected terms employed herein. The definitions include various examples and/or forms of components that fall within the scope of a term and that can be used for implementation. The examples are not intended to be limiting. Further, one having ordinary skill in the art will appreciate that the components discussed herein, can be combined, omitted or organized with other components or into organized into different architectures.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

A "module", as used herein, includes, but is not limited to, hardware, firmware, software in execution on a machine, and/or combinations of each to perform a function(s) or an action(s), and/or to cause a function or action from another module, method, and/or system. A module can include a software controlled microprocessor, a discrete logic circuit, an analog circuit, a digital circuit, a programmed logic device, a memory device containing executing instructions, and so on.

An "operable connection", or a connection by which entities are "operably connected", is one in which signals, physical communications, and/or logical communications can be sent and/or received. An operable connection can include a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "portable device", as used herein, is a computing device typically having a display screen with user input (e.g., touch, keyboard) and a processor for computing. Portable devices include, but are not limited to, handheld devices, mobile devices, smart phones, laptops, tablets and e-readers.

A "vehicle", as used herein, refers to any moving vehicle that is capable of carrying one or more human occupants and is powered by any form of energy. The term "vehicle" includes, but is not limited to: cars, trucks, vans, minivan.

Figure 1:
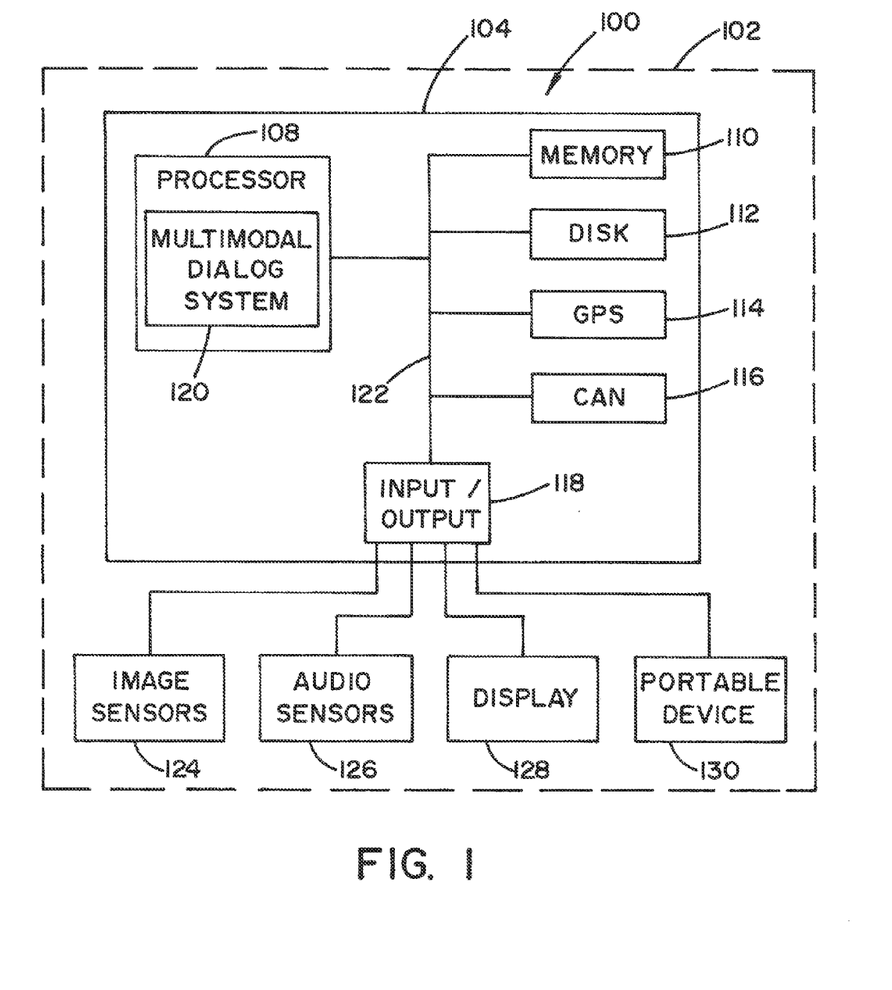
FIG. 1 is a schematic view of an illustrative system for providing multimodal human-vehicle interaction and belief tracking according to one exemplary embodiment.

Referring now to the drawings, wherein the showings are for purposes of illustrating one or more exemplary embodiments and not for purposes of limiting same, FIG. 1 illustrates a system 100 for providing multimodal human-vehicle interaction and belief tracking. The system 100 illustrated in FIG. 1 is implemented within a vehicle 102. For example, the system 100 can be implemented alone or in combination with a vehicle computing device 104 (e.g., a navigation system, an infotainment system, a portable device, etc.). It is to be appreciated that the system 100 can also be implemented in other non-vehicle systems and computing devices that provide human-machine interaction. Additionally, it is to be appreciated that the components of system 100, as well as the components of other systems and architectures discussed herein, can be combined, omitted or organized into different architectures for various embodiments.

In the illustrated embodiment shown in FIG. 1, the vehicle computing device 104 includes a processor 108, a memory 110, a disk 112, a global positioning system (GPS) 114, a Controller Area Network (CAN) 116 and an input/output (I/O) module 118. The processor 108 further includes a multimodal dialog system 120 for facilitating multimodal human-vehicle interaction, which will be discussed in further detail herein with reference to FIG. 2. The components of system 100 and the vehicle computing system 104 can be operably connected for computer communication via a bus 122 and/or other known wired and wireless technologies.

The I/O module 118 facilitates data input and output between the components of the vehicle computing device 104 and a plurality of image sensors 124, a plurality of audio sensors 126, a display 128 and a portable device 130. The plurality of image sensors 124 and the plurality of audio sensors 126 are configured for sensing, monitoring and processing interaction data associated with one or more vehicle occupants (not shown) in the vehicle 102. Interaction data can represent data and/or input in more than one modality. For example, interaction data can include speech input (e.g., audio activity, spoken utterances), gesture and/or motion input (e.g., physical activity, body position and movement, head position, orientation and movement, eye gaze position and movement), among others. Although the system 100 is described herein with the plurality of image sensors 124 and the plurality of audio sensors 126, it is to be appreciated that the system 100 can include any type of sensors known for monitoring and sensing multimodal interaction data associated with the vehicle occupants.

The plurality of image sensors 124 can include, but are not limited to, one or more cameras, camera arrays, gesture sensors, motion sensors, three dimensional sensors. Each of the plurality of image sensors 124 is configured and positioned, for example, in the vehicle 102, to monitor physical activity of the vehicle occupants. The plurality of audio sensors 126 can include, but are not limited to, one or more microphones and microphone arrays. Each of the plurality of audio sensors 126 is configured and positioned, for example, in the vehicle 102, to monitor audio activity of the vehicle occupant, such as spoken utterances. Spoken utterances can include commands, requests, queries, clarifications, system navigation requests or any sound from the vehicle occupant.

The display 128 can be a human machine interface (HMI) with hardware and software for proving vehicle occupant input and output. In one embodiment discussed herein, the display 128 can provide a visualization of a current human-vehicle interaction session (e.g., a real time human-vehicle dialog). The portable device 130 can also be utilized alone or in combination with the display 128 for providing vehicle occupant input and output. In some embodiments, the portable device 130 can also monitor multimodal interaction associated with the vehicle occupant or receive multimodal interaction data from an external source (e.g., the Internet, a network).

Figure 2:
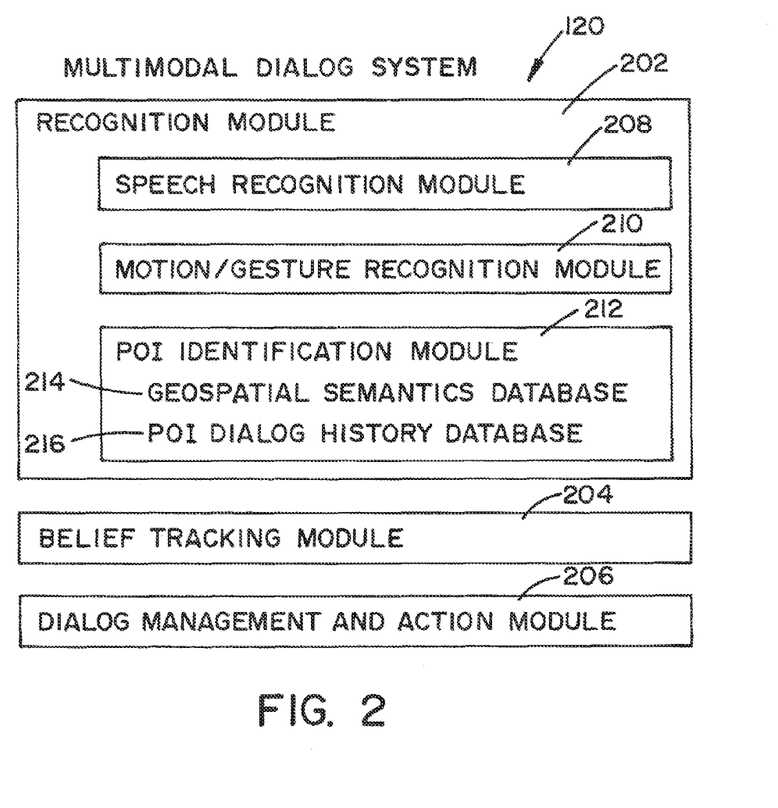
FIG. 2 is a schematic view of an illustrative multimodal dialog system of the system of FIG. 1.

Referring now to FIG. 2, an exemplary system architecture of the multimodal dialog system 120 of FIG. 1 will now be discussed. The multimodal dialog system 120 includes a recognition module 202, a belief tracking module 204 and a dialog management and action module 206. It is to be appreciated that the components and functions of the multimodal dialog system 120, can be combined, omitted or organized into different architectures for various embodiments. Further, it is to be understood that the components of the multimodal dialog system 120 are operably connected for computer communication thereby allowing the components to communicate various types of data and messages. In one embodiment, the framework for the multimodal dialog system 120 can be implemented with middleware, such as the Human-Robot Interaction Toolkit (HRLtk), described in U.S. Provisional Application Ser. No. 61/831,783, incorporated by reference herein. For example, messages using topics/services can be implemented to communicate data, states, hypotheses, contexts, beliefs, requests, among others.

In the illustrated embodiment of FIG. 2, the recognition module 202 performs multimodal recognition of interaction data that represents more than one modality. The interaction data can be received or retrieved from a plurality of sensors, for example, the image sensors 124 and the audio sensors 126. The interaction data indicates a physical activity or an audio activity associated with a vehicle occupant, for example, a gesture, an eye gaze, a head position, a head movement, a body position, a body movement, a spoken utterance, among others. For example, in one embodiment, the interaction data includes a speech input and a gesture input obtained or received from the plurality of sensors.

The recognition module 202 can include a speech recognition module 208 configured to perform automatic speech recognition (ASR) and natural language understanding (NLU) on the interaction data, specifically, speech input. For example, text (e.g. words) can be recognized using ASR and observations (e.g., concepts) can be extracted from the text with a word confidence score using NLU. The speech recognition module 208 can assign the text to dialog slots based on word confidence scores and grammar rules. A slot confidence score may be assigned dialog slots based on the degree of certainty in the observation. Based on the dialog slots and text, at least one recognition hypothesis is generated. A hypothesis confidence score is assigned to each hypothesis and may be based on how many dialog slots are matched, the word and slot confidence scores, the dependencies and relatedness between the assigned slots or any other suitable factor.

The recognition module 202 can also include a motion/gesture recognition module 210 configured to recognize motion and gesture events based on the interaction data, specifically, gesture input. For example, the motion/gesture recognition module 210 can include skeletal tracking to determine the body position or movement of the vehicle occupant or an appendage of the vehicle occupant (e.g., hands, arms). Gaze tracking can be used to determine the vehicle occupant's eye gaze. Head pose tracking can be used to determine a position, orientation or movement of the vehicle occupant's head.

The recognition module 202 also includes a point of interest (POI) identification module 212 for determining at least one reference to at least one POI in the speech input. For example, the POI identification module 212 can utilize a geospatial semantics database 214 to determine whether a speech input, or the text recognized by the ASR, includes a reference to a POI. The reference can be a reference to geospatial data related to a geographical location (i.e., the POI). For example, a word indicating a POI (e.g., a noun, pronoun, a name, a street), a characteristic of the POI (e.g., a shape, a size, a color), among others.

Further, the POI identification module 212 can also determine whether the reference to the POI is a reference to a previously mentioned POI (i.e., a past POI or a new POI) in a current dialog session. The POI identification module 212 can utilize a POI dialog history database (DB) 216, which stores dialog history including, visual points of interest and references to the points of interest, to determine if the POI identified in the reference is a POI previously mentioned or identified in a current dialog session.

If the POI identification module 212 determines a reference to a POI, then the POI identification module 212 is configured to extract at least one visual point of interest (POI) from the gesture input based on the reference. The visual point of interest is geolocated based on the reference to the POI (e.g., the geospatial data) gesture input, a location of the vehicle and an orientation of the vehicle. In one embodiment, the motion/gesture recognition module 210, as discussed above, determines an eye gaze and/or an estimated head angle. Based on at least one of the eye gaze, the estimated head angle and an estimated vehicle location and/or vehicle orientation determined by the GPS 114, one or more POIs (i.e., the visual points of interest) are extracted from the vehicle occupant's field of view. In one embodiment, the visual points of interest can be stored, for example, in the POI dialog history DB 216. Thus, if the POI identification module 212 determines that the reference to the POI is within a current dialog, the visual points of interest corresponding to the referenced POI can be retrieved from the POI dialog history DB 216. The visual point of interest includes not only the POIs but also the geospatial data (e.g., characteristics of the POI) and the geolocated data (e.g., vehicle location, vehicle orientation) associated with the POI.

The recognition module 202 is further configured to augment at least one recognition hypothesis based on at least one visual point of interest. The augmentation can include rescoring, adding, modifying or updating the hypotheses, dialog slots, and/or confidence scores based on at least one visual point of interest.

In one embodiment, the recognition hypotheses are augmented by determining or modifying soft and hard confidence scores associated with the visual point of interest. For example, if more than one visual point of interest is extracted from the vehicle occupant's point of view, the soft and hard confidence scores are determined and used to correctly identify the intended POI. The soft and hard confidence scores can be associated with the geospatial data and/or the geolocated data of the POI. For example, if the reference to the POI in the speech input is "that large building", the one or more visual points of interest extracted from the vehicle occupant's field of view can include geospatial data associated with the size of the building and geolocated data. The modification to the recognition hypothesis can include the extracted visual points of interest with a soft score associated with the size of the building. This will allow the belief tracking module 204 to filter the visual points of interest and determine an intended POI based on speech evidence (i.e., the reference to the POI) and gaze evidence (i.e., the visual points of interest) using the augmented recognition hypotheses. It is appreciated that hard and soft confidence scores can be based on any geospatial or geolocated data associated with the reference to a POI.

The belief tracking module 204 is configured to determine a belief state of the vehicle occupant's intent based on the recognition hypotheses. The belief tracking can be implemented using probabilistic ontology trees (POTs). The POTs are built with observed nodes associated with the dialog slots of the recognition hypotheses. Thus, the POTs can include concept nodes, speech evidence nodes and gaze evidence nodes, which will be described in further detail herein. The belief tracking module 204 determines a joint probability distribution for each observed node based on the slot assignments and confidence of the nodes. A belief state is then determined based on the joint probability distribution tables of the POT's observed and unobserved nodes. Thus, speech and gaze evidence from several dialog turns including POI information can be combined. Additionally, in one embodiment, the probability of evidence for each observed node is decayed over time. Thus, for each turn, the probabilities of all the observed nodes are multiplied by a small constant (<1) while the probability of the unobserved nodes are maintained.

The dialog management and action module 206 is configured to select an action to take based on the determined belief state. For example, the action can be selected by comparing the belief state to a policy, where the policy includes a map of actions to belief states. Actions can include, but are not limited to, performing speech synthesis to present information in response to a speech utterance, request clarification, request additional information; displaying information in response on the display 128; executing a command to a vehicle system or altering a vehicle system, executing a query, for example, on the Internet, and returning the query, among others. Further, a visualization of the human-vehicle interaction session can be presented in real-time on the display 128. The visualization can also include play-back of recorded human-vehicle interaction.

Figure 3:
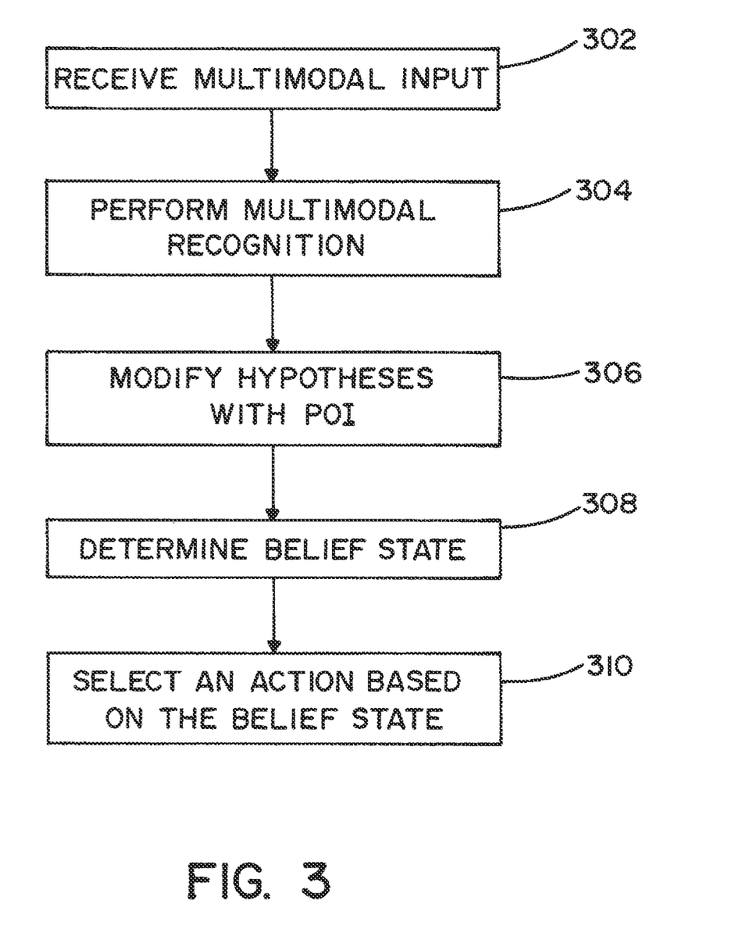
FIG. 3 is a flow chart illustrating a method for multimodal human-vehicle interaction and belief tracking according to one embodiment.

Referring now to FIG. 3, a method is shown for multimodal human-vehicle interaction and belief tracking according to one exemplary embodiment. The method of FIG. 3 will be described with reference to the systems and components of FIGS. 1 and 2, though it is to be appreciated that the method could be used with other systems and components. The method of FIG. 3 includes, at step 302, receiving input from an occupant of a vehicle via more than one mode. The input can be interaction data received from a plurality of sensors associated with the vehicle, for example, the plurality of image sensors 124 and the plurality of audio sensors 126. The input can include a speech input (e.g., a spoken utterance) and a gesture input (e.g., a gesture, an eye gaze, a head position, a head movement, a body position, a body movement, etc.). In another embodiment, step 302 includes receiving an input from an occupant of a vehicle including a first input and a second input, wherein the first and second input represent different modalities (e.g., a speech input, a gesture input).

The method of FIG. 3 also includes, at step 304, performing multimodal recognition of the input. In one embodiment, multimodal recognition of the first and second input is performed. Multimodal recognition will now be described with reference to FIG. 4. It is to be appreciated that the steps represented in FIG. 4 can be performed sequentially or in parallel. At step 402, the method includes performing speech recognition of the speech input. In one embodiment, the speech recognition is performed by the speech recognition module 208 using ASR and NLU on the speech input. The speech recognition module 208 can generate one or more recognition hypotheses based on the speech input.

Referring again to FIG. 4, at step 404, the method includes performing gesture recognition of the gesture input. In one embodiment, the recognition module 202 including the motion/gesture recognition module 210 is configured to recognize motion and gesture events based on gesture input. Motion and gesture events can include skeletal tracking, gaze tracking and head pose tracking.

Figure 4:
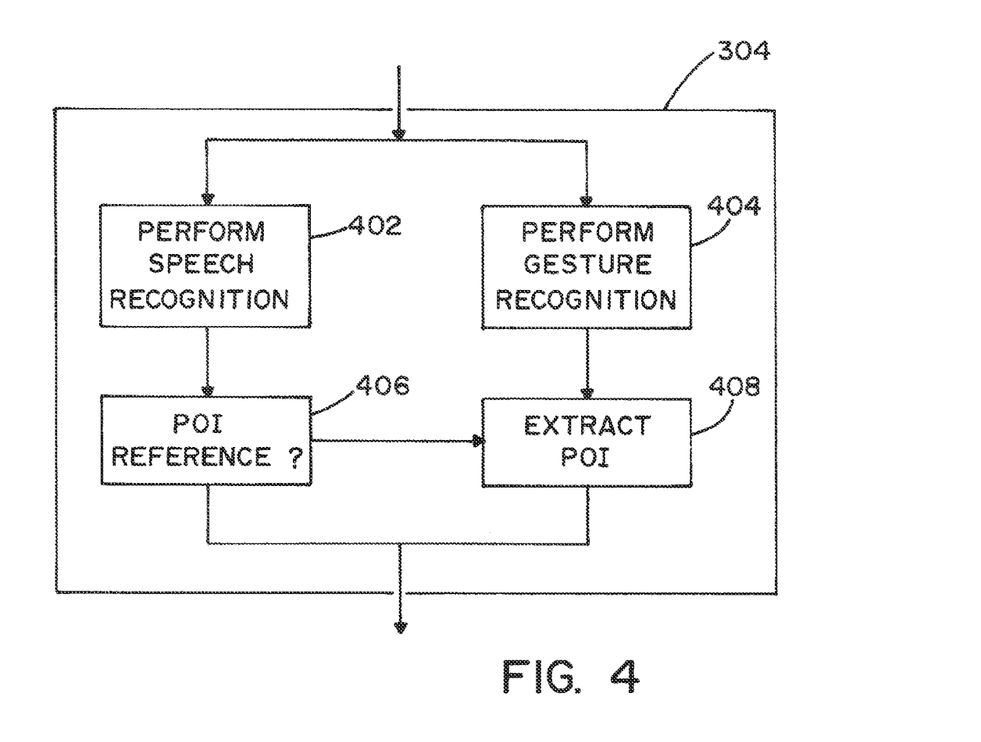
FIG. 4 is a flow chart illustrating a method for multimodal recognition according to one embodiment.

At step 406, the speech recognition can further include determining a reference to at least one point of interest in the speech input. In one embodiment, the recognition module 202 including the POI identification module 212 is configured to determine a reference to POI utilizing a geospatial semantics database 214 to determine whether a speech input, or the text recognized by ASR, includes a reference to a POI (e.g., geospatial data). Further, the POI identification module 212 can determine whether the POI refers to a POI in a current dialog session utilizing a POI dialog history database.

At step 408, the gesture recognition can include extracting at least one geo-located visual point of interest from the gesture input based on the reference to the POI in the speech input. In one embodiment, the POI identification module 212 is configured to extract the geo-located visual point of interest from the gesture input based on the reference to the POI in the speech input. For example, the motion/gesture recognition module 210, discussed above, determines an eye gaze and/or an estimated head angle. Based on at least one of the eye gaze, the estimated head angle and an estimated vehicle location and/or vehicle orientation determined by the GPS 114, one or more POIs (i.e., the visual points of interest) are extracted from the vehicle occupant's field of view.

Referring again to FIG. 3, the method continues at step 306 with augmenting a recognition hypothesis based on a visual point of interest. In another embodiment, the step 306 includes modifying a recognition hypothesis of the first input with the second input. The augmentation and/or the modification of the recognition hypotheses can include rescoring, adding, modifying or updating the hypotheses, dialog slots, and/or confidence scores based on at least one visual point of interest. As discussed above, the augmentation can also include the addition or modification of confidence scores associated with the visual points of interest. The confidence scores can be used to filter one or more visual points of interest to one or more intended points of interest.

The method of FIG. 3 also includes, at step 308, determining a belief state of the occupant's intent based on the recognition hypothesis. The belief tracking module 204 can be configured to determine the belief state using probabilistic ontology trees (POTs) generated based on the recognition hypotheses. At step 310, an action is selected based on the determined belief state. The dialog management and action module 206 can be configured to select an action to take based on the determined belief state using a policy, including a map of actions and belief states.

Figure 5A:
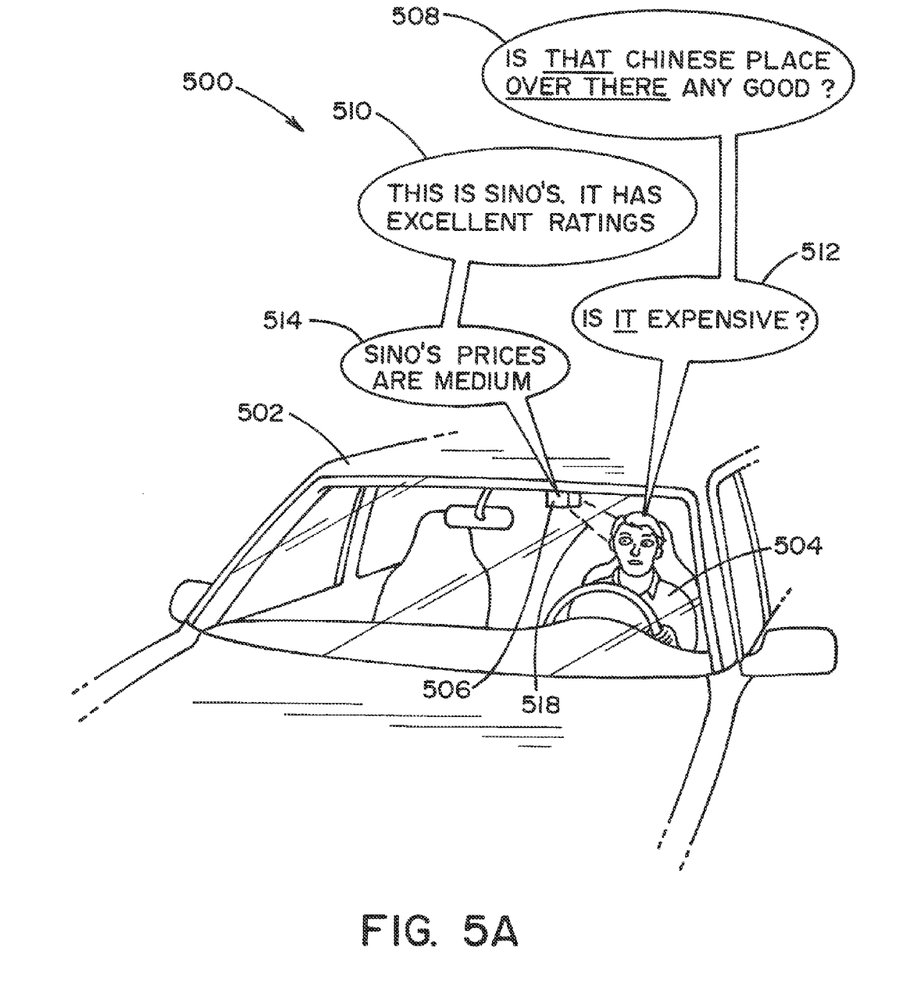
FIG. 5A is an illustrative example of multimodal human-vehicle interaction implemented in a vehicle.

With reference to FIGS. 5A, 5B, 6A and 6B, illustrative examples of multimodal human-vehicle interaction sessions using the systems and methods described in FIGS. 1-4 will now be discussed. FIG. 5A illustrates a dialog session 500 that takes place in a vehicle 502 with a vehicle occupant 504. The vehicle 502 can include a vehicle computing device 506, similar to the vehicle computing device 104 of FIG. 1. The dialog session 500 includes dialog turns 508, 510, 512 and 514 representing speech input and output from the vehicle occupant 504 and the vehicle computing system 506.

In operation, during a dialog turn 508, the vehicle occupant 504 asks "Is that Chinese place over there any good?" The dialog turn 508 is received as speech input by a plurality of sensors, for example, the plurality of audio sensors 126. The speech recognition module 208 of the recognition module 202 performs speech recognition on the speech input using ASR and NLU. At least one recognition hypothesis is generated based on the speech input, dialog slots, and confidence scores. Further, the motion/gesture recognition module 210 can recognize a gesture input associated with the vehicle occupant 504. For example, an eye gaze 518 of the vehicle occupant 504 can be a gesture input recognized and tracked by the motion/gesture recognition module 210.

The POI identification module 212 can determine one or more references to one more point of interests (POI) in the dialog turn 508 using a geospatial semantics database 214. For example, the words "that" and "over there" in the dialog turn 508 can be references to a POI, specifically, a Chinese place. Once a reference to the POI is identified, the POI identification module 212 extracts at least one geo-located visual point of interest from the gesture input based on the reference. For example, one or more geo-located visual points can be extracted from the vehicle occupant's 504 field of view based on the eye gaze 518, and the location and orientation of the vehicle 502 obtained from the GPS 114. The recognition hypothesis can be augmented with the geo-located visual POIs.

Figure 5B:
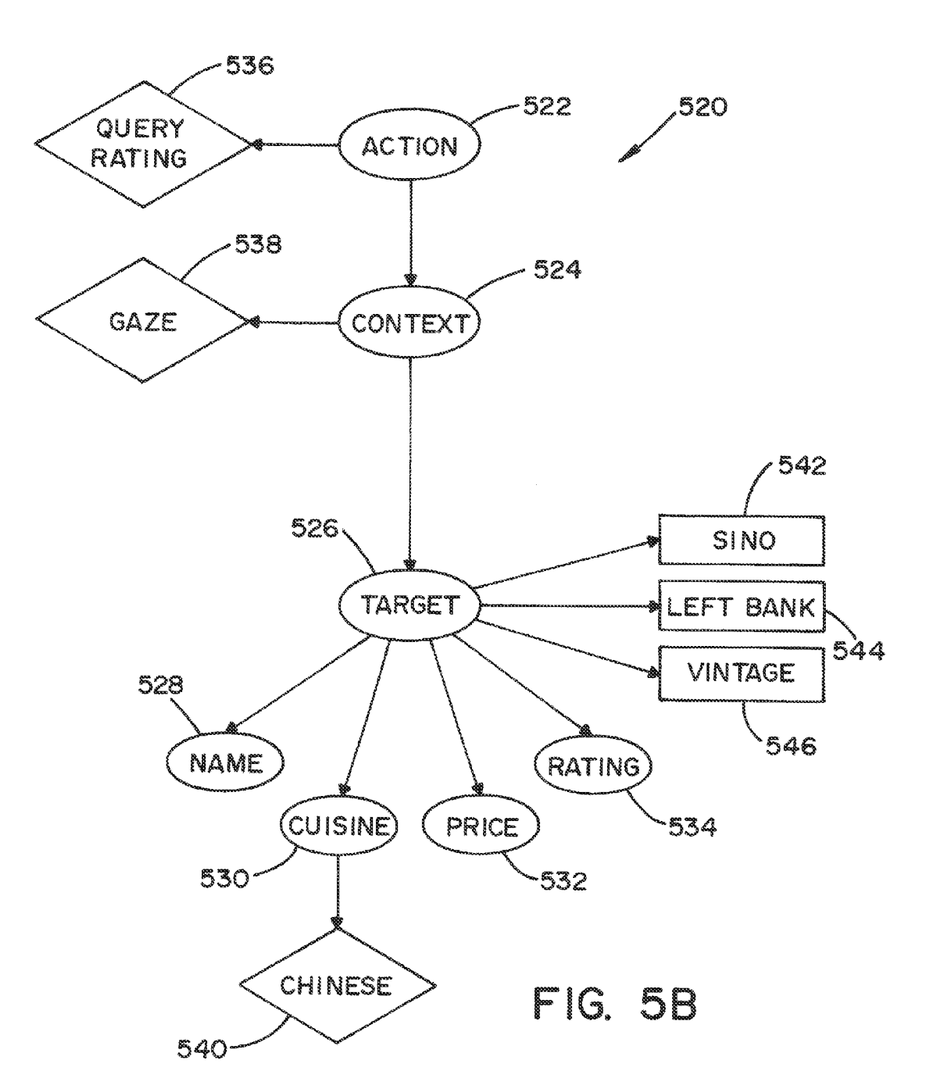
FIG. 5B is an exemplary probabilistic ontology tree according to the illustrative example of FIG. 5A.

The recognition hypothesis is used by the belief tracking module 204 to determine a belief state using probabilistic ontology trees (POTs). FIG. 5B illustrates a POT 520 associated with the dialog session 500 of FIG. 5A. A POT is a tree-structured Bayesian Network that extends a domain ontology by specific probability distributions for Bayesian Network node values. Each POT node represents a particular concept or sub-concept within a domain. The concepts and/or sub-concepts can be extracted by the speech recognition module 208 and represented in the recognition hypotheses. POTs include nodes representing concepts independent of multimodal input (e.g., the speech input and the gesture input) from the vehicle occupant 504 ("unobserved nodes") and nodes representing concepts observed from the multimodal input ("observed nodes"). Unobserved nodes exist for each domain concept and sub concept represented by the POT.

Each POT node has an associated probability distribution (not shown) representing the probability that the concept representing by the unobserved node take a particular value. Observed nodes have an associated probability distribution (not shown) representing the likelihood that the multimodal input associated with the node and an intended node value and that the speech recognition module 208 and/or the belief tracking module 204 correctly or incorrectly identified the intended node value.

In the illustrated example of FIG. 5B, the POT 520 includes an action node 522, a context node 524 and a target node 526. The action node 522 represents a domain ontology indicating the possible actions the vehicle occupant 504 may take, namely finding a target associated with the target node 526 using a particular human-vehicle interaction context associated with the context node 524. Each node can include any number of sub-nodes. For example, the target node 526 includes the following sub-nodes: a name node 528, a cuisine node 530, a price node 532, and a rating node 534. It is appreciated that the POT 520 can include any number of nodes and sub-nodes and the nodes can be of any type, including specialization (IS-A relationships) nodes and composition (HAS-A relationships) nodes.

The nodes of the POT 520 are modified with observed evidence nodes identified in the recognition hypotheses associated with the dialog turns 508, 510, 512 and 514. At each turn, the POT 520 is updated. The observed nodes include speech evidence nodes and gesture evidence nodes. In FIG. 5B, the speech evidence nodes are represented by a diamond shape and the gesture evidence nodes are represented by a square shape.

After the one or more recognition hypotheses associated with the dialog turn 508 are received by the belief tracking module 204, the POT 520 is updated with observed nodes from the recognition hypotheses modified with the extracted geo-located visual points of interest. For example, the action node 522 is modified with a speech evidence node 536 indicating a possible user action "Query Rating" from the dialog turn 508 (e.g., "any good?") The context node 524 is modified with a speech evidence node 538 indicating that the context of the query includes a gaze context identified by the references to the POI (e.g., "that", "over there") in the dialog turn 508. Further, the cuisine node 530 is modified with a speech evidence node 540 indicating the cuisine Chinese (e.g., "Chinese Place") in the dialog turn 508.

As discussed above, the recognition hypothesis is modified with extracted geo-located visual points of interest identified by the references to a POT in the dialog turn. In the POT 520, the target node 526 is modified with the visual points of interest extracted from the vehicle occupant's 504 eye gaze 518. Namely the gaze evidence nodes 542, 544 and 546 represent visual points of interest Sino, Left Bank and Vintage, respectively. Based on the POT 520 generated from the recognition hypotheses, the belief tracking module 204 determines belief intent and the dialog management and action module 206 selects and executes an action. In this case, the vehicle computing system can query the Internet for a rating associated with the intended POI, Sino. Through speech synthesis, an audio output of the rating is executed resulting in dialog turn 510 from the vehicle computing device 506, namely, "This is Sino's. It has excellent ratings."

In FIG. 5A the dialog session 500 further includes another request from the vehicle occupant 504 at the dialog turn 512, "Is it Expensive?" As discussed above, multimodal recognition is again performed on the dialog turn 512. In one embodiment, the POI identification module 212 determines whether the references to the POI are within a current dialog session.

For example, at the dialog turn 512 the vehicle occupant asks "Is it Expensive?" The POI identification module 212 recognizes the reference to a point of interest (i.e., "it") in the dialog turn 512. The POI identification module 212 utilizing a POI dialog history DB 216 determines if the reference to the POI "it" refers to a POI in a current dialog session. Here, "it" refers to "Sino's" in the dialog turn 510. The visual POI associated with "Sino's" can be retrieved from the POI dialog history DB 216. Then the recognition hypothesizes associated with the dialog turn 512 is augmented with the visual POI.

The POT 520 is updated based on the recognition hypotheses of the dialog turn 512. In this example, the speech evidence node 536 would be updated with "Query Price" (not shown) indicating a new possible action intended by the vehicle occupant 504. A belief state is determined by the belief tracking module 204 and the dialog management and action module executes an action based on the POT 510. Specifically, the dialog management and action module 206 determines the price of Sino's (e.g., through an Internet query) and using speech synthesis, a dialog turn 514 is executed by the vehicle computing device 506, stating "Sino's prices are medium."

Figure 7:
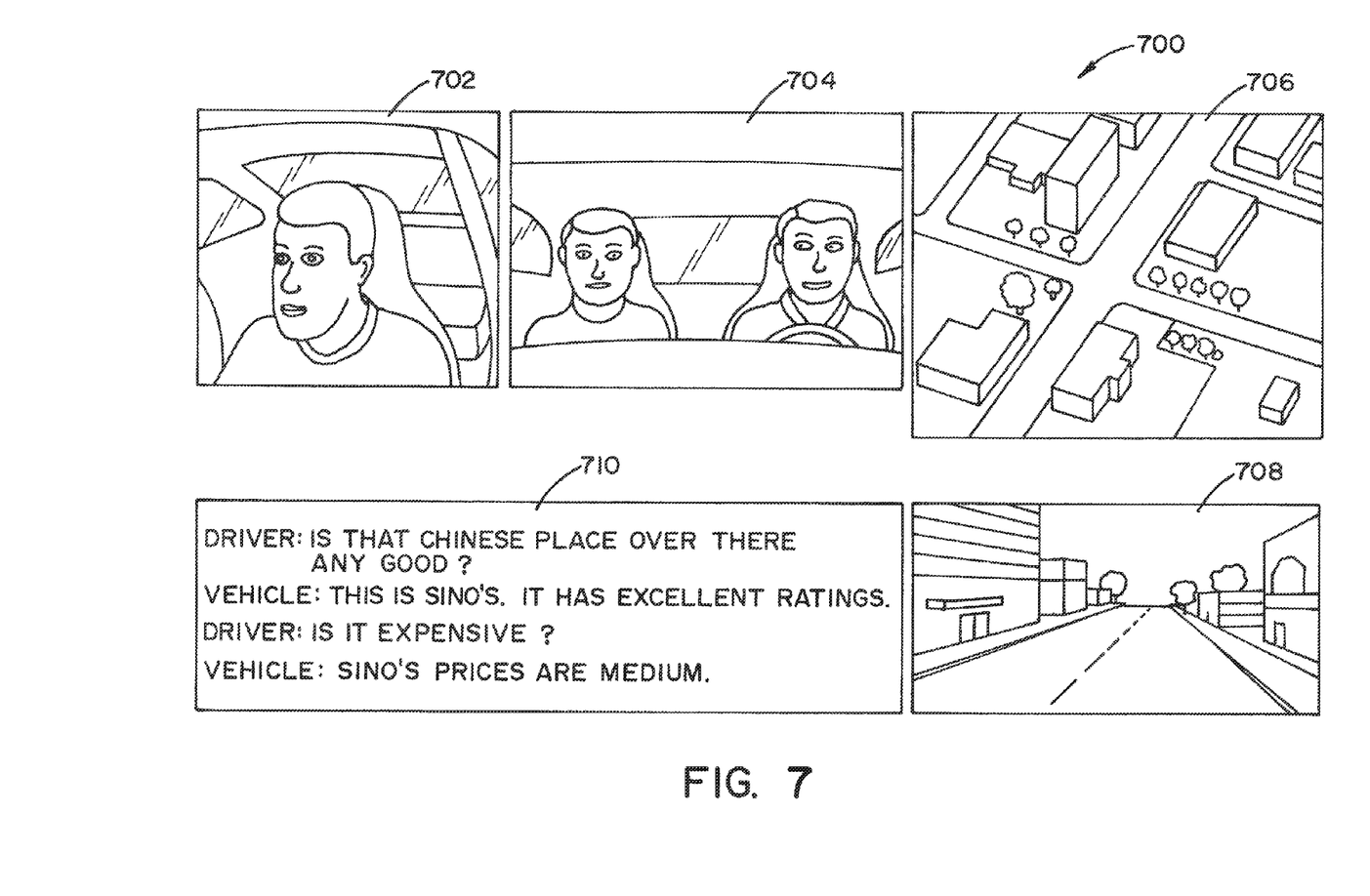
FIG. 7 is a schematic view of a visualization of the multimodal human-vehicle interaction according to one embodiment.

In addition to the audio responses from the vehicle computing device 506, the dialog action and management module 206 can also present a visualization 700 in real time of the human-vehicle interaction as shown in FIG. 7. The visualization 700 can be displayed on a display 128 or a portable device 130. The visualization 700 can include a video stream 702 of the vehicle occupant 504 and a video stream 704 of the vehicle 502 interior, a geo-located gaze tracker view 706 and a current street view 708. Further, a real-time representation 710 of gaze and speech dialog interaction can be displayed.

Figure 6A:
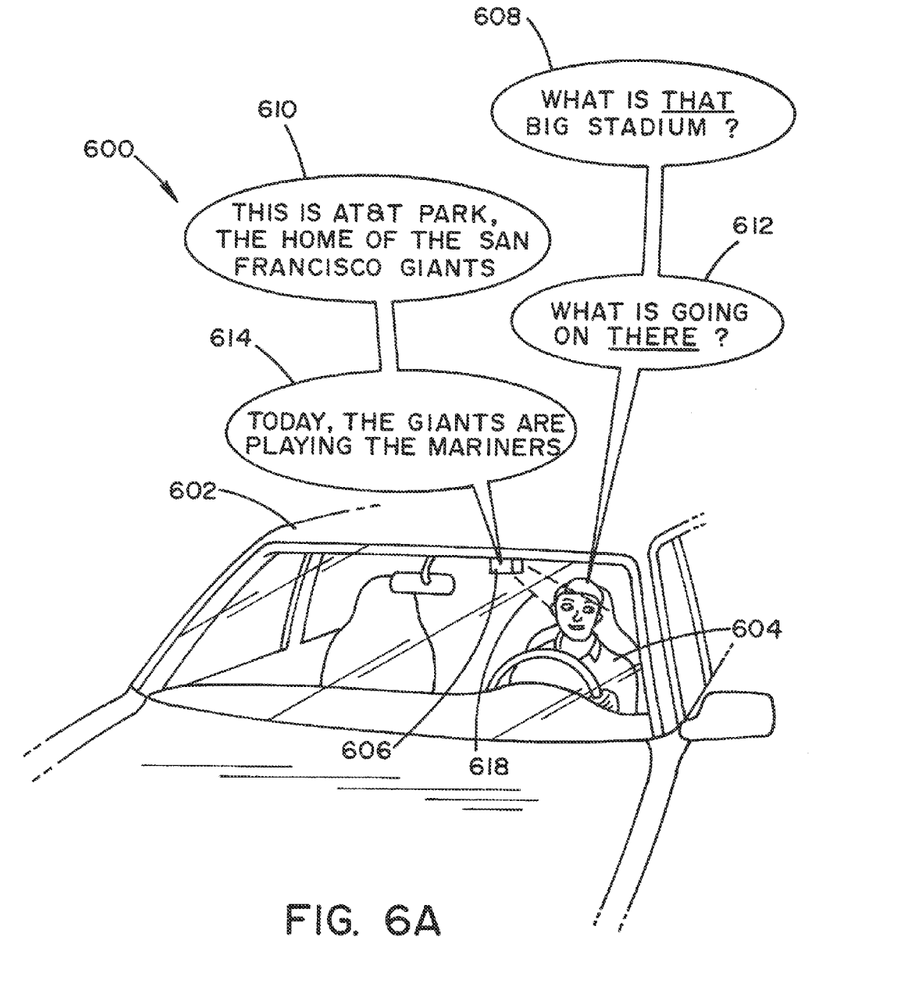
FIG. 6A is another illustrative example of multimodal human-vehicle interaction implemented in a vehicle.
Figure 6B:
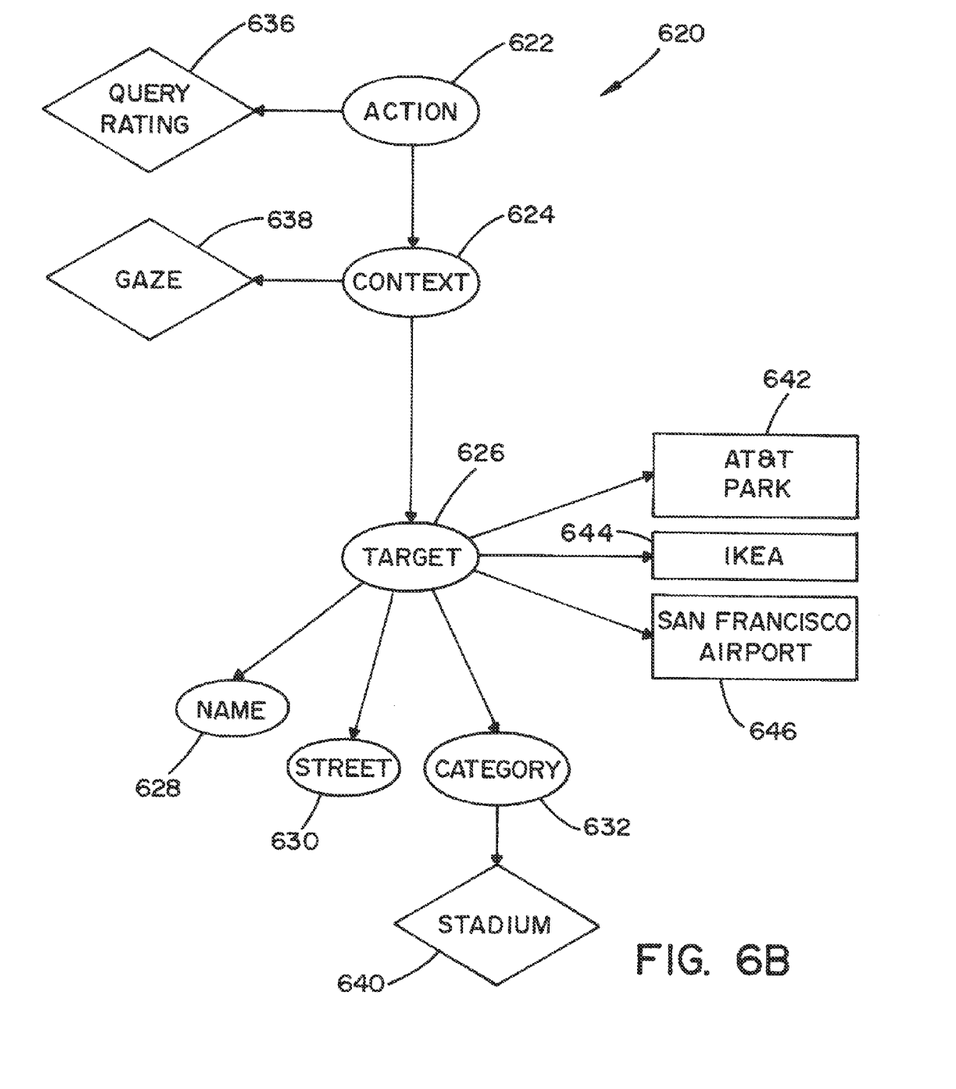
FIG. 6B is an exemplary probabilistic ontology tree according to the illustrative example of FIG. 6A.

Another illustrative example will now be discussed with reference to FIGS. 6A and 6B. Similar to FIG. 5A, FIG. 6A illustrates a dialog session 600 that takes place in a vehicle 602 with a vehicle occupant 604. The vehicle 602 can include a vehicle computing device 606, similar to the vehicle computing device 104 of FIG. 1. The dialog session 600 includes dialog turns 608, 610, 612 and 614, representing speech input and output from the vehicle occupant 604 and the vehicle computing system 606.

In operation, during a dialog turn 608, the vehicle occupant 608 asks "What is that big stadium?" The dialog turn 608 is received as speech input by a plurality of sensors, for example, the plurality of audio sensors 126. The speech recognition module 208 of the recognition module 202 performs speech recognition on the speech input using ASR and NLU. At least one recognition hypothesis is generated based on the speech input, dialog slots, and confidence scores. Further, the motion/gesture recognition module 210 can recognize a gesture input associated with the vehicle occupant 604. For example, an eye gaze 618 of the vehicle occupant 604 can be a gesture input recognized and tracked by the motion/gesture recognition module 210.

The POI identification module 212 can then determine one or more references to one more point of interests (POI) in the dialog turn 608 using a geospatial semantics database 214. For example, the words "that" and "big" can be references to a point of interest, specifically, a stadium. Once a reference to the POI is identified, the POI identification module 212 extracts at least one geo-located visual point of interest from the gesture input based on the reference. For example, one or more geo-located visual points can be extracted from the vehicle occupant's 604 field of view based on the eye gaze 618, and the location and orientation of the vehicle 602 obtained from the GPS 114. Further, the visual point of interest can include spatial data and identifying characteristics related to the visual point of interest itself. For example, the size, the color, the shape, among other characteristics of the visual point of interest. In the example of FIG. 6A, the size of the visual points of interest can be included.

The recognition hypothesis is then augmented with the geo-located visual points of interest. For example, the recognition hypotheses for "stadium" can be augmented with the extracted geo-located visual points in the vehicle occupant's 604 field of view. As discussed above, the recognition module 202 is configured to augment at least one recognition hypothesis based on at least one visual point of interest. The augmentation can include rescoring, adding, modifying or updating the hypotheses, dialog slots, and/or confidence scores based on at least one visual point of interest. In the example of FIG. 6A, the recognition hypotheses can augmented by adding or modifying soft and hard confidence scores associated with the visual point of interest. For example, if the reference to the POI is determined to be "that big stadium", the modification to the recognition hypothesis associated with the reference would include extracted visual points of interest with a soft score associated with the size of the visual point of interest (e.g., the stadium building). This will allow the belief tracking module 204 to filter the visual points of interest based on speech evidence (i.e., the reference to the POI) and gaze evidence (i.e., the visual points of interest) using the augmented recognition hypotheses.

The recognition hypothesis is then used by the belief tracking module 204 to determine a belief state using probabilistic ontology trees (POTs). FIG. 6B illustrates a POT 620 associated with the dialog session 600 of FIG. 6A. Similar to the POT 520 of FIG. 5B, the POT 620 includes an action node 622, a context node 624, a target node 626. The target node 626 further includes the following sub-nodes: a name node 628, a street node 630 and a category node 632. The nodes in the POT 620 are modified with observed evidence nodes extracted from the augmented recognition hypotheses associated with the dialog turns 608, 610, 612 and 614. At each dialog turn, the POT 620 is updated. The observed nodes include speech evidence nodes and gesture evidence nodes. In FIG. 6B, the speech evidence nodes are represented by a diamond shape and the gesture evidence nodes are represented by a square shape.

After the one or more recognition hypotheses associated with the dialog turn 608 are received by the belief tracking, the POT 620 is updated with observed nodes from the recognition hypotheses modified with the extracted geo-located visual points of interest. For example, the action node 622 is modified with a speech evidence node 636 indicating a possible user action "query rating" from the dialog turn 608 text "What is that big stadium?" The context node 624 is modified with a speech evidence node 638 indicating that the context of the query includes a gaze context from references to the POI in the dialog turn 608. Further, the category node 632 is modified with a speech evidence node 640 indicating the category "stadium."

As discussed above, the recognition hypothesis modified with extracted geo-located visual points of interest identified by the references to a POT in the dialog turn. In the POT 620, the target node 626 is modified with the visual points of interest extracted from the vehicle occupant's 604 eye gaze 618. Namely the gaze evidence nodes 642, 644 and 646 represent visual points of interest AT&T Park, Ikea and San Francisco Airport respectively. Based on the POT 620, the belief tracking module 204 determines belief intent and the dialog management and action module 206 selects an action (e.g., executing a query) resulting in the audio output of dialog turn 610 from the vehicle computing device 606, namely, "This is AT&T Park, the home of the San Francisco Giants."

The dialog session 600 continues with the dialog turn 612, wherein the vehicle occupant asks, "What is going on there?" As discussed above, multimodal recognition is again performed on the dialog turn 612. In one embodiment, the POI identification module 212 can also determine whether the references to the POI are within a current dialog session. For example, at the dialog turn 612 the vehicle occupant asks "What is going on there?" The POI identification module 212 recognizes the reference to a point of interest (i.e., "there") in the dialog turn 512. The POI identification module 212 utilizing a POI dialog history DB 216 determines if the reference to the POI "there" refers to a POI in a current dialog session. Here, "it" refers to "AT&T Park" in the dialog turn 610. The visual POI associated with "AT&T Park" can be retrieved from the POI dialog history DB 216. Then the recognition hypothesizes associated with the dialog turn 612 is augmented with the visual POI.

The POT 620 is updated based on the recognition hypotheses of the dialog turn 612. In this example, the speech evidence node 636 would be updated with "Query Event" (not shown) indicating a new possible action intended by the vehicle occupant 604. A belief state is determined by the belief tracking module 204 and the dialog management and action module executes an action based on the POT 620. Specifically, the dialog management and action module 206 determines what events are taking place at AT&T Park (e.g., through an Internet query) and using speech synthesis, a dialog turn 614 is executed by the vehicle computing device 606, stating "Today, the Giants are playing the Mariners." It is to be appreciated that the dialog session 600 can also be presented in real-time using visualization as shown in FIG. 7. By providing dialog and belief state tracking that considers the entire context of the vehicle occupant and the vehicle (e.g., multimodal input), a truly in-vehicle immersive interaction is possible.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for multimodal human-vehicle interaction, comprising:
    receiving input from an occupant in a vehicle via more than one mode, wherein the input includes a speech input and a gesture input;
    performing multimodal recognition of the input to determine a reference to a point of interest based on the speech input and to extract a visual point of interest based on the gesture input and the reference to the point of interest in the speech input;
    augmenting at least one recognition hypothesis based on the visual point of interest;
    determining a belief state of the occupant's intent, wherein the belief state is determined based on joint probability distribution tables of probabilistic ontology trees and the probabilistic ontology trees are based on the recognition hypothesis; and
    selecting an action to take based on the determined belief state.

2. The method of claim 1, wherein performing multimodal recognition includes speech recognition of the speech input and gesture recognition of the gesture input.

3. The method of claim 2, wherein the speech recognition includes determining whether the point of interest is present in a current dialog.

4. The method of claim 1, wherein extracting the visual point of interest is based on the speech input, the gesture input, and a location of the vehicle.

5. The method of claim 4, wherein the gesture input includes at least an eye gaze of the occupant.

6. A method for multimodal human-vehicle interaction, comprising:
   receiving an input from an occupant of a vehicle including a first input and a second input, wherein the first and second inputs represent different modalities;
   performing multimodal recognition of the first and second inputs to determine a reference of a point of interest based on the first input and to extract a visual point of interest based on the second input and the reference to the point of interest in the first input;
   modifying a recognition hypothesis of the first input with the second input;
   determining a belief state of the occupant's intent, wherein the belief state is determined based on joint probability distribution tables of probabilistic ontology trees and the probabilistic ontology trees are based on the recognition hypothesis; and
   selecting an action to take based on the determined belief state.

7. The method of claim 6, wherein extracting the visual point of interest is based on the first input, the second input, and a location of the vehicle.

8. The method of claim 7, wherein the recognition hypothesis is modified based on the visual point of interest.

9. The method of claim 7, including determining whether the reference to the visual point of interest is within a current dialog.

10. A system for multimodal human-vehicle interaction, comprising:
    a plurality of sensors for sensing interaction data from a vehicle occupant, wherein the interaction data includes a speech input and a gesture input;
    a multimodal recognition module for performing multimodal recognition of the interaction data;
    a point of interest identification module for determining a reference to a point of interest based on the speech input and to extract a visual point of interest based on the gesture input and the reference to the point of interest in the speech input, wherein the multimodal recognition module augments a recognition hypothesis based on the visual point of interest,
    a belief tracking module for determining a belief state of the occupant's intent, wherein the belief state is determined based on joint probability distribution tables of probabilistic ontology trees and the probabilistic ontology trees are based on the recognition hypothesis; and
    a dialog management and action module for selecting an action to take based on the determined belief state.

11. The system of claim 10, including a point of interest history database wherein the point of interest identification module utilizes the database to determine whether the reference to the point of interest is within a current dialog.

12. The system of claim 10, wherein extracting the visual point of interest from the gesture input is based on the speech input, the gesture input, and a location of the vehicle.

\* \* \* \* \*